United States Patent
Hellmann et al.

(10) Patent No.: US 11,289,720 B2
(45) Date of Patent: Mar. 29, 2022

(54) FUEL CELL HAVING A VARIABLE WATER PERMEABILITY

(71) Applicant: Robert Bosch GmbH, Stuttgart (DE)

(72) Inventors: Mark Hellmann, Korntal (DE); Stefan Schoenbauer, Ditzingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 171 days.

(21) Appl. No.: 16/765,520

(22) PCT Filed: Oct. 15, 2018

(86) PCT No.: PCT/EP2018/078024
§ 371 (c)(1),
(2) Date: May 20, 2020

(87) PCT Pub. No.: WO2019/096512
PCT Pub. Date: May 23, 2019

(65) Prior Publication Data
US 2020/0321638 A1     Oct. 8, 2020

(30) Foreign Application Priority Data
Nov. 20, 2017   (DE) .................... 10 2017 220 669.1

(51) Int. Cl.
*H01M 8/04*      (2016.01)
*H01M 8/04119*   (2016.01)

(52) U.S. Cl.
CPC ... *H01M 8/04141* (2013.01); *H01M 8/04149* (2013.01)

(58) Field of Classification Search
CPC ...................... H01M 8/04141; H01M 8/04149
USPC .......................................................... 429/413
See application file for complete search history.

(56) References Cited

U.S. PATENT DOCUMENTS

| | | | |
|---|---|---|---|
| 6,451,470 B1* | 9/2002 | Koschany | H01M 8/1004 429/414 |
| 2004/0253504 A1* | 12/2004 | Mossman | H01M 8/0234 429/434 |
| 2008/0241606 A1* | 10/2008 | Gallagher | H01M 8/04559 429/414 |

FOREIGN PATENT DOCUMENTS

| | | |
|---|---|---|
| EP | 2701226 | 2/2014 |
| JP | 2003092112 A | 3/2003 |
| JP | 2003173798 | 6/2003 |
| JP | 2006147425 A | 6/2006 |
| JP | 2007018821 A | 1/2007 |
| JP | 2007123122 | 5/2007 |
| JP | 2010067389 A | 3/2010 |

OTHER PUBLICATIONS

International Search Report for Application No. PCT/EP2018/078024 dated Dec. 11, 2018 (English Translation, 2 pages).

* cited by examiner

*Primary Examiner* — James M Erwin
(74) *Attorney, Agent, or Firm* — Michael Best & Friedrich LLP

(57) ABSTRACT

The invention relates to a fuel cell (100) comprising an anode chamber (10) for supplying a fuel-containing gas mixture, a cathode chamber (20) for supplying an oxygen-containing gas mixture, and a membrane (30) for transporting fuel ions from the anode chamber (10) into the cathode chamber (20). For this purpose, according to the invention, the membrane (30) has a graduated water permeability.

14 Claims, 3 Drawing Sheets

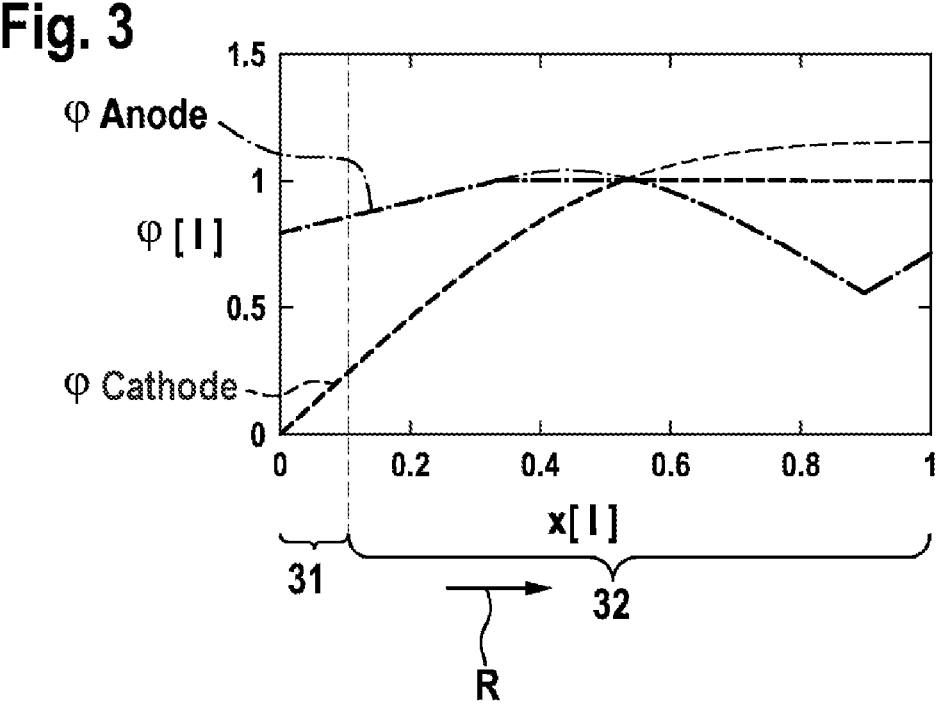
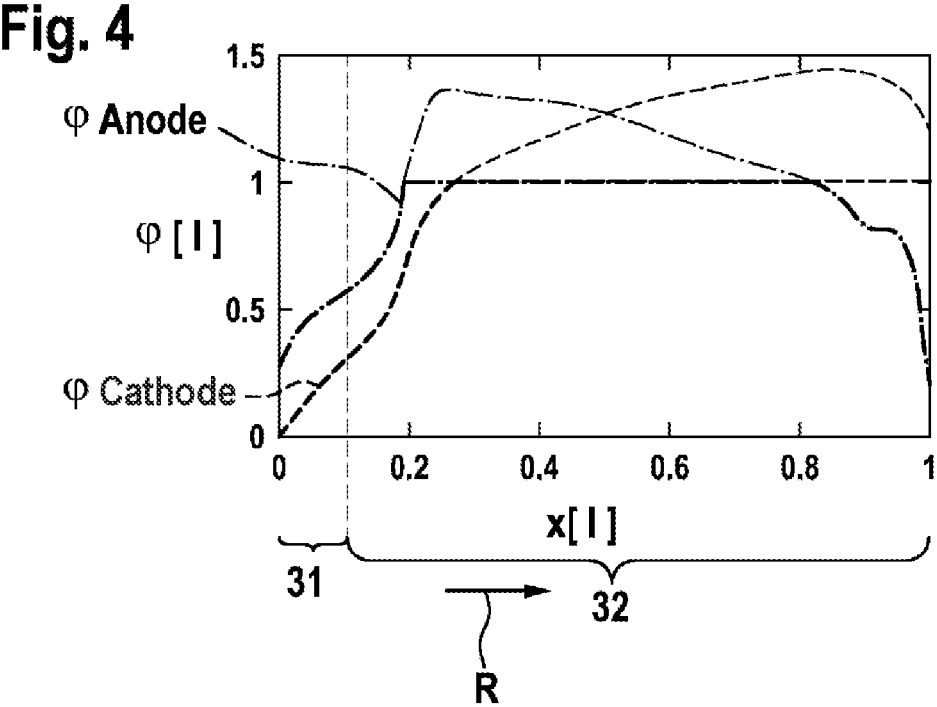

FUEL CELL HAVING A VARIABLE WATER PERMEABILITY

BACKGROUND OF THE INVENTION

The present invention relates to a fuel cell.

Fuel cells, for example PEM fuel cells, represent attractive technology for a $CO_2$-free energy economy. Fuel cells have a membrane which is proton-conducting. However, the proton conductivity of the membrane is highly dependent on the membrane humidity. Maximum membrane humidity is therefore indispensable for stable operation of the fuel cell. However, owing to the electroosmotic drag, water molecules also migrate from the anode to the cathode in addition to protons. At the same time, the ohmic resistance of the fuel cell depends on the membrane thickness. Within the last decade, the membrane thickness has reduced from about 100-200µm to 10µm. A further reduction in the membrane thickness is to be expected. As the membrane thickness falls, the water permeability of the membrane also increases, which disadvantageously facilitates the effect of dehumidification of the anode. In addition, fuel cells are mostly operated superstoichiometrically, wherein the oxygen-containing gas mixture is compressed and thereby heated, which likewise contributes to the dehumidification of the membrane. Known measures against dehumidification of the membrane are recirculation of the anode gas mixture and humidification of the cathode supply air by means of an external humidifier.

SUMMARY OF THE INVENTION

The present invention provides a fuel cell wherein the membrane is formed with a graded water permeability. Features and details that are described in connection with the individual embodiments of the invention can of course be combined so that, with regard to the disclosure of the individual aspects of the invention, reference always is made or can be made reciprocally.

The invention provides a fuel cell which is formed with an anode chamber for providing a fuel-containing gas mixture, a cathode chamber for providing an oxygen-containing gas mixture, and a membrane for transporting fuel ions from the anode chamber to the cathode chamber. For this purpose it is provided according to the invention that the membrane is configured with a graded water permeability.

Within the meaning of the invention, "graded water permeability" means water permeability that changes monotonically (for example is configured to increase or decrease), i.e. not periodically. The fuel cell within the meaning of the invention can be combined in a stack with other equivalent fuel cells to form a fuel cell system, a so-called stack. A fuel cell system so formed can be used in mobile applications, for example in motor vehicles, and in stationary applications, for example as a generator.

The idea underlying the invention is to use a membrane which has a gradient of the water permeability over its surface area, for example: a membrane with a graded thickness, or material thickness, in particular decreasing in the flow direction of the oxygen-containing gas mixture, or a corresponding variable chemical composition. By means of a graded water permeability of the membrane, an optimum compromise can be established between a low middle membrane thickness for low ohmic losses and a sufficiently large membrane thickness at the cathode entry, or anode exit (in particular over the geometric extent). The advantage of the invention resides in stable water management, or a stable water balance, of the fuel cell in operation. Permanently high fuel cell performances are thus also possible, and advances in membrane technology (thickness reduction) can be implemented in real operation. In summary, it is found that a membrane having a graded water permeability ensures improved humidification of the fuel cell anode, or of the anode chamber, even when very thin membranes are used.

The invention can further provide, in a fuel cell, that the membrane, when seen in the flow direction of the oxygen-containing gas mixture, has an entry region and an operating region, wherein a lower water permeability is established in the entry region, at least in part, than in the operating region. In the flow direction of the oxygen-containing gas mixture, high temperatures prevail at the entry region of the fuel cell cathode, or of the cathode chamber, which can lead to a dry gas mixture. The concentration of the product water in the oxygen-containing gas mixture only increases as the gas mixture passes through the cathode chamber. Dry air at the entry into the fuel cell can disadvantageously extract water from the anode chamber. Specifically in the entry region, it is therefore advantageous to reduce the water permeability in order to prevent the diffusion of the water from the anode chamber into the cathode chamber.

The invention can further provide that the entry region of the membrane, when seen in the flow direction of the oxygen-containing gas mixture, accounts for between 1% and 20%, preferably from 1% to 10%, of the total length of the membrane. Surprisingly, the invention has found that a very narrow entry region with a reduced water permeability can already be sufficient to effectively and reliably prevent drying out of the membrane on the anode side, since this effect is most pronounced at the entry into the cathode chamber. Advantageously, a region of only 20%, and in the case of thicker membranes even only 10%, can reliably prevent the water from passing from the anode chamber into the cathode chamber. The membrane would therefore have to be treated or thickened only in the narrow entry region in order to achieve uniform humidification of the membrane over its entire length.

It is further conceivable within the scope of the invention that the water permeability of the membrane, when seen in the flow direction of the oxygen-containing gas mixture, increases monotonically or stepwise from an entry region to an operating region. Depending on the production method, it can be advantageous to provide a water permeability of the membrane that increases either monotonically or stepwise. Thus, in the case of a chemical composition, a stepwise adjustment of the water permeability, for example by doping, can be advantageous, whereas in the case of a layer formation, stepwise water permeability of the membrane can be of advantage.

In addition, the invention can provide, in the case of a fuel cell, that the graded water permeability is provided by a changing chemical composition of the membrane or by a structuring or coating of at least one surface of the membrane, in particular with a constant thickness of the membrane. With the aid of chemical additives or specific structuring or coating of the membrane, the water permeability can be influenced. If the thickness of the membrane thereby remains constant, then the assembly of the fuel cell is not affected at all by the graded water permeability.

Moreover, it can be advantageous in a fuel cell within the meaning of the invention if the graded water permeability is provided by a change in the thickness of the membrane, in particular with a constant chemical composition of the membrane. The graded water permeability according to the invention can thus be achieved simply and inexpensively.

The invention can further provide that a change in the thickness of the membrane is produced by a layer formation. Consequently, not only simple but also precisely adjustable water permeability can be achieved.

It is further conceivable within the scope of the invention that, in the case of a layer formation of the membrane, multiple layers of the membrane are connected together by a material-bonded connection. This can achieve the advantage that ion conductivity of the membrane is ensured by the layers, without interruption.

Furthermore, the invention can provide that, when seen in the flow direction of the oxygen-containing gas mixture, the thickness of the membrane, at least in an entry region of the membrane, is from 20% to 200%, preferably from 50% to 200%, of the normal thickness of the membrane in an operating region. In other words, in the entry region of the membrane, a thickness of preferably up to twice the normal thickness of the membrane can be provided. As a result, it can reliably be made possible, in a simple manner, that the water molecules in the entry region of the membrane do not pass from the anode chamber to the cathode chamber.

In addition, it is conceivable within the scope of the invention that the ion conductivity of the membrane is adapted to a change in the water permeability of the membrane in order to permit a uniform diffusion resistance for the fuel ions through the membrane over the entire length of the membrane. This can advantageously ensure uniform ion conductivity over the entire total length of the membrane.

BRIEF DESCRIPTION OF THE DRAWINGS

The fuel cell according to the invention and further developments thereof, and also the advantages thereof, will be explained in greater detail below with reference to drawings. The drawings show, in each case schematically:

FIG. 3 a schematic representation of a humidity curve within a fuel cell with a specific membrane thickness, FIG. 4 a schematic representation of a humidity curve within a fuel cell with a membrane thickness that is approximately five times smaller than the membrane thickness according to FIG. 3, and FIG. 5 a schematic structure of a membrane according to the invention.

DETAILED DESCRIPTION

Figure 1:
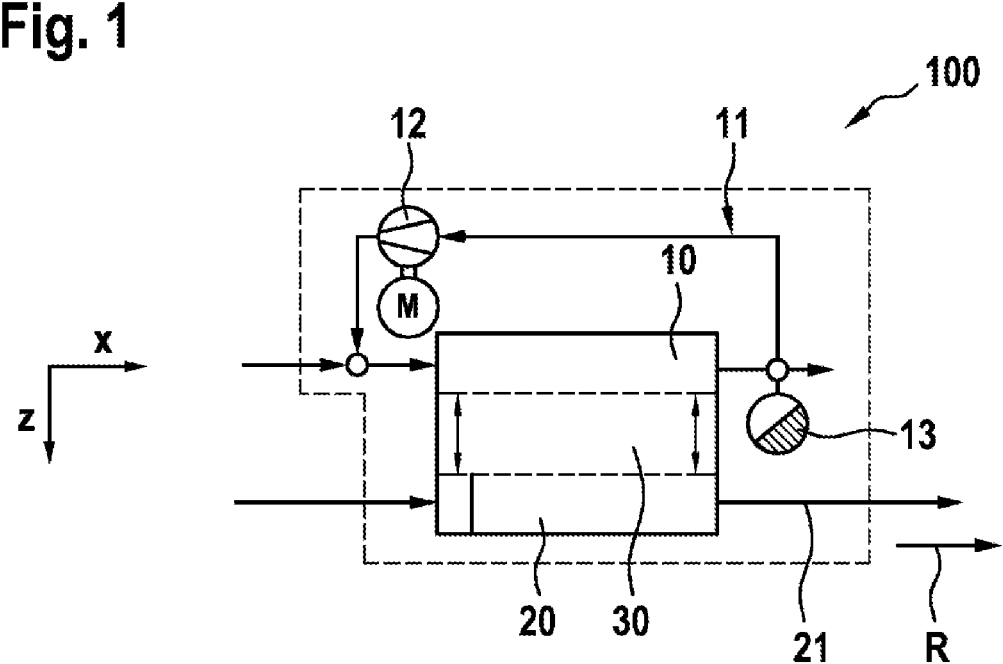
FIG. 1 a schematic layout of a fuel cell with anode recirculation.

In the various figures, identical parts of the fuel cell 100 are always provided with the same reference numerals, so that such parts are generally only described once.

FIG. 1 depicts a typical system topology of a fuel cell 100, which is designed with an anode chamber 10 for providing a fuel-containing gas mixture, a cathode chamber 20 for providing an oxygen-containing gas mixture, and a membrane 30 for transporting fuel ions from the anode chamber 10 to the cathode chamber 20. The oxygen-containing gas mixture for the cathode chamber 20 of the fuel cell 100 is mostly drawn in from the environment of the fuel cell 100 in the form of simple ambient air. The fuel-containing gas mixture, for example hydrogen, is mostly provided to the anode chamber 10 of the fuel cell 100 from a tank. Corresponding lines 11, 21 are provided for transporting the reactants to and from the respective chamber 10, 20. A recirculation pump 12 is additionally provided in the anode line 11, which pump sends unconsumed fuel-containing gas mixture back into the anode chamber 10. The cathode line 21 is mostly open to the outside, in order to discharge unconsumed air from the cathode chamber 20.

In the example of FIG. 1, the anode is operated co-currently with the cathode. The air, or the oxygen-containing gas mixture, flows into the cathode space 20, exchanges water vapor with the anode chamber 10 via the membrane 30, and at the same time transports the water that is produced in the flow direction R of the oxygen-containing gas mixture out of the cathode chamber 20 and thus out of the fuel cell 100. The humidity of the oxygen-containing gas mixture, or of the cathode air, thus increases from the entry to the exit. In the anode line 11, fresh fuel-containing gas mixture from the tank is mixed with a recirculated gas mixture before entering the anode chamber 10. An external humidifier is usually not used in the anode line 11. The fresh fuel-containing gas mixture is removed from the tank in the dry state. The humidity of the fuel-containing gas mixture before it enters the anode chamber 10 is therefore dependent on the amount of humidity that is recirculated from the anode exit to the anode entry. The thinner the membrane 30, the lower the diffusion resistance for water. This results in an increased exchange of water between the cathode chamber 20 and the anode chamber 10 of the fuel cell 100.

Figure 2:
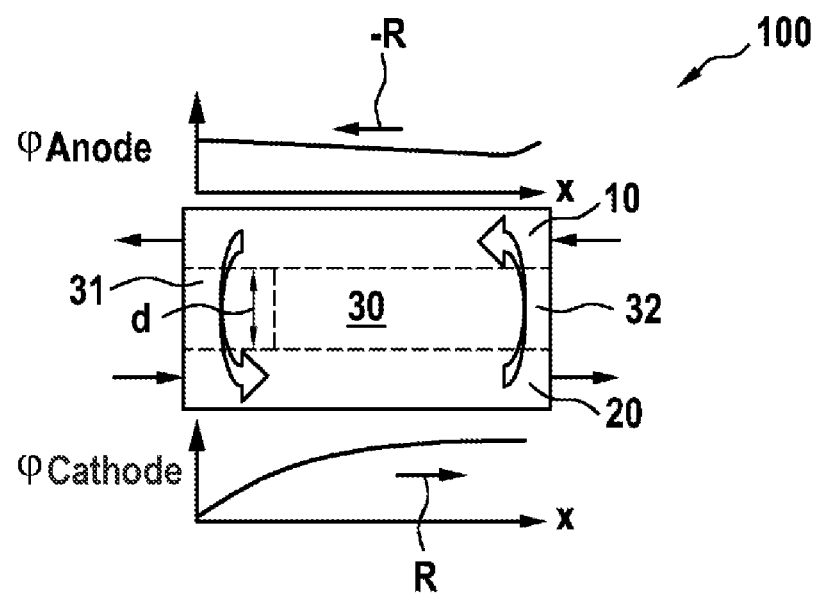
FIG. 2 a schematic representation of a humidity curve within a fuel cell.

FIG. 2 shows the anode operating counter-currently relative to the cathode. An internal circulation of water, as shown by the curved arrows, is thereby facilitated. This circulation of water increases the amount of water circulating and allows the fuel cell 100 to be operated without an external humidifier even at operating temperatures above 60° C. In addition to the flow directions, the curves of the relative humidity φ are also shown at the top for the anode chamber 10 (see $\varphi_{anode}$) and at the bottom for the cathode chamber 20 (see $\varphi_{cathode}$). Without an external humidifier, the air flows into the cathode chamber 20 in the dry state. Its humidity generally increases by absorption of the product water. The partial pressure difference of the water vapor between the anode chamber 10 and the cathode chamber 20 is greatest at the entry to the cathode chamber 20. As a result, the cathode air extracts water from the anode chamber 10 at that point, which water cannot be circulated in the system and thus is also not available for humidifying the anode entry. In the steady state, a balanced water balance of the fuel cell is established.

Using simulation models, it is possible to show that the coupling of the cathode and anode humidity curves via the diffusion resistance of the membrane 30 has a major influence on the water balance of the fuel cell 100. The water permeability is directly dependent on the diffusion resistance of the water molecules through the membrane 30 and on the membrane thickness d.

In FIGS. 3 and 4, the water balance of two scenarios is shown. In the first case of FIG. 3, the diffusion resistance of the membrane 30 is at a specific value, which corresponds to a specific membrane thickness d. In the second case of FIG. 4, the simulation is carried out with a diffusion resistance for water molecules through the membrane 30 that is chosen to be smaller, for example by a factor of 5. The large reduction in the diffusion resistance assists with illustrating the effect of the dehumidification of the membrane on the anode side. In reality, the reduction in the diffusion resistance will possibly be smaller, but it will nevertheless be relevant for the water balance within the fuel cell 100.

In the view of FIG. 3 it will be seen that the cathode air, or the oxygen-containing gas mixture, flows through the cathode in the positive x-direction. "x=0" thereby corresponds to the cathode entry and "x=1" to the cathode exit, which corresponds in the view of FIG. 3 to a direction from left to right and at the same time to the flow direction R of the oxygen-containing gas mixture through the cathode chamber 20. The coolant temperature also increases in that flow direction R. The condensed cathode air reaches the cathode chamber 20 in the heated state and without having been humidified by an external humidifier and quickly absorbs water from the anode chamber 10. The gradient of the increase in humidity in the cathode air is steepest at the cathode entry. The gradient decreases more and more in the direction towards the cathode exit because the vapor partial pressure difference with respect to the anode chamber 10 becomes increasingly smaller. At humidities above "1", liquid water can pass out. The fuel-containing gas mixture, or the anode gas mixture, flows through the anode chamber 10 in the negative x-direction. "x=1" thereby corresponds to the anode entry and "x=0" to the anode exit, which corresponds in the view of FIG. 3 to the direction from right to left. The relative humidity of the anode gas mixture initially falls as a result of heating to the stack temperature in the region of "x=1". The humidity then increases to a maximum at approximately "x=0.45" and thereafter falls again, because water vapor diffuses in the direction towards the very dry cathode entry.

In the second case according to FIG. 4 with a significantly lower diffusion resistance of the membrane 30, for example with a significantly smaller thickness d than the membrane thickness d according to FIG. 3, the same effects occur. However, the effects are significantly more pronounced, as is apparent from FIG. 4. At "x=0", the gradient of the increase in humidity in the cathode chamber 20 is much steeper than in the first case. This has the result that the anode chamber 10, which continues to be operated countercurrently with the fuel-containing gas mixture, contains less humidity than in the first case. Thus, the material recirculated to the anode also has a lower humidity content, which is noticeable at "x=1" at the anode entry. There too, the anode chamber 10 is very dry. As a result of the low diffusion resistance, the humidity in the anode chamber 10 again increases very quickly therebetween. The humidity curve in the anode is at a higher level on average in the second case than in the first case, but at the expense of the homogeneity of the humidity. This adversely affects a homogeneous current density distribution in the fuel cell 100 and thus also adversely affects a maximum power density.

Figure 5:
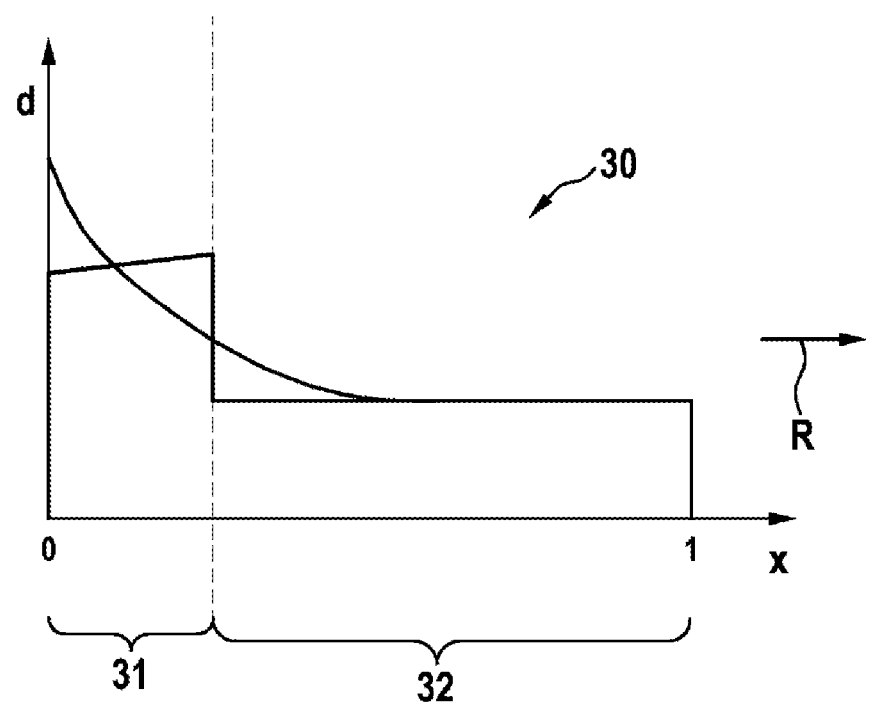

For restoring the homogeneity of the humidification in the fuel cell 100, the invention proposes reducing the passage of water at the anode exit (here, for example, between "0<x<0.1") by low water permeability of the membrane 30, as is shown, for example, by means of FIG. 5. As a result, the anode discharges less water to the cathode in the cathode entry region and more water can be recirculated in the anode path. This in turn helps to increase the entry humidity of the anode gas mixture between 0.9<x<1.

Within the meaning of the invention, a graded water permeability can be implemented by the following variants:

The membrane 30 can be so formed that the permeability is graded in the flow direction R of the oxygen-containing gas mixture. This could be achieved, for example, by a changing chemical composition of the membrane 30, which grades the diffusion resistance for water. It is further conceivable that the membrane 30 can be so configured on one or both surfaces, for example by means of a structuring or a coating (for example a water-impermeable coating), that the adsorption/desorption properties vary over the length of the membrane 30.

It can further be established within the scope of the invention that the ion conductivity remains independent of the graduated water permeability and is preferably sufficiently high over the entire surface area of the membrane 30 to allow the fuel ions to pass with as little resistance as possible through the membrane 30.

However, the membrane 30 can further be provided with ion conductivity which is likewise graded, in order to ensure uniform ion conductivity over the entire length of the membrane 30.

A graded water permeability can further be achieved by a graded thickness d of the membrane 30 in the flow direction R of the oxygen-containing gas mixture, for example with the same chemical membrane structure. The thickness d of the membrane 30 has a direct influence on the diffusion resistance for water molecules. In the region of "0<x<0.2", but at least "0<x<0.1", the invention provides that the membrane thickness d is increased by at least 20%, for example by from 50% to 200%, relative to the remaining region of the fuel cell 100. Ideally, the increase is stepless. However, it is also equally conceivable, that the partial thickness change can take place by the superposition of multiple layers, or plies, of the membrane 30 with constant thickness d. It is further conceivable that the superposed membrane layers can additionally be joined together, for example by hot pressing.

The preceding description of the figures describes the present invention solely within the scope of examples. Individual features of the embodiments can of course be freely combined with one another, where technically expedient, without departing from the scope of the invention.

The invention claimed is:

1. A fuel cell (100) comprising
   an anode chamber (10) for providing a fuel-containing gas mixture,
   a cathode chamber (20) for providing an oxygen-containing gas mixture, and
   a membrane (30) for transporting fuel ions from the anode chamber (10) to the cathode chamber (20),
   wherein the membrane (30) is formed with a graded water permeability.

2. The fuel cell (100) as claimed in claim 1, characterized in that the membrane (30), when seen in a flow direction (R) of the oxygen-containing gas mixture, has an entry region (31) and an operating region (32), wherein a lower water permeability is established in the entry region (31), at least in part, than in the operating region (32).

3. The fuel cell (100) as claimed in claim 2, characterized in that the entry region (31) of the membrane, when seen in the flow direction (R) of the oxygen-containing gas mixture, accounts for between 1% and 20% of the total length of the membrane (30).

4. The fuel cell (100) as claimed in claim 1, characterized in that the water permeability of the membrane (30), when seen in a flow direction (R) of the oxygen-containing gas mixture, increases monotonically or stepwise from an entry region (31) to an operating region (32).

5. The fuel cell (100) as claimed in claim 1, characterized in that the graded water permeability is provided by a changing chemical composition of the membrane (30) or by a structuring or coating of at least one surface of the membrane (30).

6. The fuel cell (100) as claimed in claim 1, characterized in that the graded water permeability is provided by a change in a thickness (d) of the membrane (30).

7. The fuel cell (100) as claimed in claim 6, characterized in that the change in the thickness (d) of the membrane (30) is produced by a layer formation.

8. The fuel cell (100) as claimed in claim 7, characterized in that, in the case of the layer formation of the membrane (30), multiple layers of the membrane (30) are connected together by a material-bonded connection.

9. The fuel cell (100) as claimed in claim 1, characterized in that when seen in a flow direction (R) of the oxygen-containing gas mixture, a thickness (d) of the membrane (30), at least in an entry region (31) of the membrane (30), is from 20% to 200% of a normal thickness of the membrane (30) in an operating region (32).

10. The fuel cell (100) as claimed in claim 1, characterized in that an ion conductivity of the membrane (30) is adapted to a change in the water permeability of the membrane (30) in order to permit a uniform diffusion resistance for the fuel ions through the membrane (30) over an entire length of the membrane (30).

11. The fuel cell (100) as claimed in claim 2, characterized in that the entry region (31) of the membrane, when seen in the flow direction (R) of the oxygen-containing gas mixture, accounts for between 1% and 10% of the total length of the membrane (30).

12. The fuel cell (100) as claimed in claim 1, characterized in that the graded water permeability is provided by a changing chemical composition of the membrane (30) or by a structuring or coating of at least one surface of the membrane (30) with a constant thickness (d) of the membrane (30).

13. The fuel cell (100) as claimed in claim 1, characterized in that the graded water permeability is provided by a change in a thickness (d) of the membrane (30) with a constant chemical composition of the membrane (30).

14. The fuel cell (100) as claimed in claim 1, characterized in that when seen in a flow direction (R) of the oxygen-containing gas mixture, a thickness (d) of the membrane (30), at least in an entry region (31) of the membrane (30), is from 50% to 200% of a normal thickness of the membrane (30) in an operating region (32).

* * * * *